United States Patent [19]
Howlings et al.

[11] Patent Number: 5,730,863
[45] Date of Patent: Mar. 24, 1998

[54] REPLACEABLE WATER FILTER ASSEMBLY FOR WATER-BOTTLE FED COOLER HOUSING

[75] Inventors: Robin Howlings, Gananoque; Michel Morand, Montreal, both of Canada

[73] Assignees: Addico Products Inc., Pointe-Claire; Danamark Industries, Brompton, both of Canada

[21] Appl. No.: 674,632

[22] Filed: Jul. 5, 1996

[51] Int. Cl.$^6$ ...................................... B01D 17/12
[52] U.S. Cl. .................... 210/109; 210/123; 210/232; 210/473; 210/541; 222/185.1; 222/189.06; 62/389
[58] Field of Search .................... 62/389, 391, 397; 222/185.1, 189.06, 180, 181.1, 181.2, 181.4; 210/104, 109, 232, 257.1, 282, 473, 474, 541, 542, 86, 91, 94, 123, 323.2, 335, 97

[56] References Cited

U.S. PATENT DOCUMENTS

| | | | |
|---|---|---|---|
| 1,977,006 | 10/1934 | Muenster | 210/109 |
| 4,946,599 | 8/1990 | Craig | 210/474 |
| 4,995,975 | 2/1991 | Jacquot et al. | 210/474 |
| 5,003,790 | 4/1991 | Goupil | 62/397 |
| 5,391,293 | 2/1995 | Hansen | 210/109 |
| 5,573,142 | 11/1996 | Morellato et al. | 222/146.1 |

*Primary Examiner*—Joseph W. Drodge
*Attorney, Agent, or Firm*—Swabey Ogilvy Renault

[57] ABSTRACT

A filter adaptor assembly for a water cooler of the type having a support housing provided with a water bottle support at a top end to support an inverted water bottle over a water reservoir of the housing. The filter adaptor assembly comprises a support platform having a support base and it is connected in support engagement above the water reservoir. Supports are connected to the support base for securing one or more filter cartridges thereto. A dispensing valve is secured under the base and has a conduit for receiving treated water from the filter assembly. The valve has a water level sensing float mechanism which is adapted to detect the water level in the reservoir to dispense or cut-off the supply of treated water to the reservoir. The filter assembly is also connected to a pressurized water supply.

13 Claims, 5 Drawing Sheets

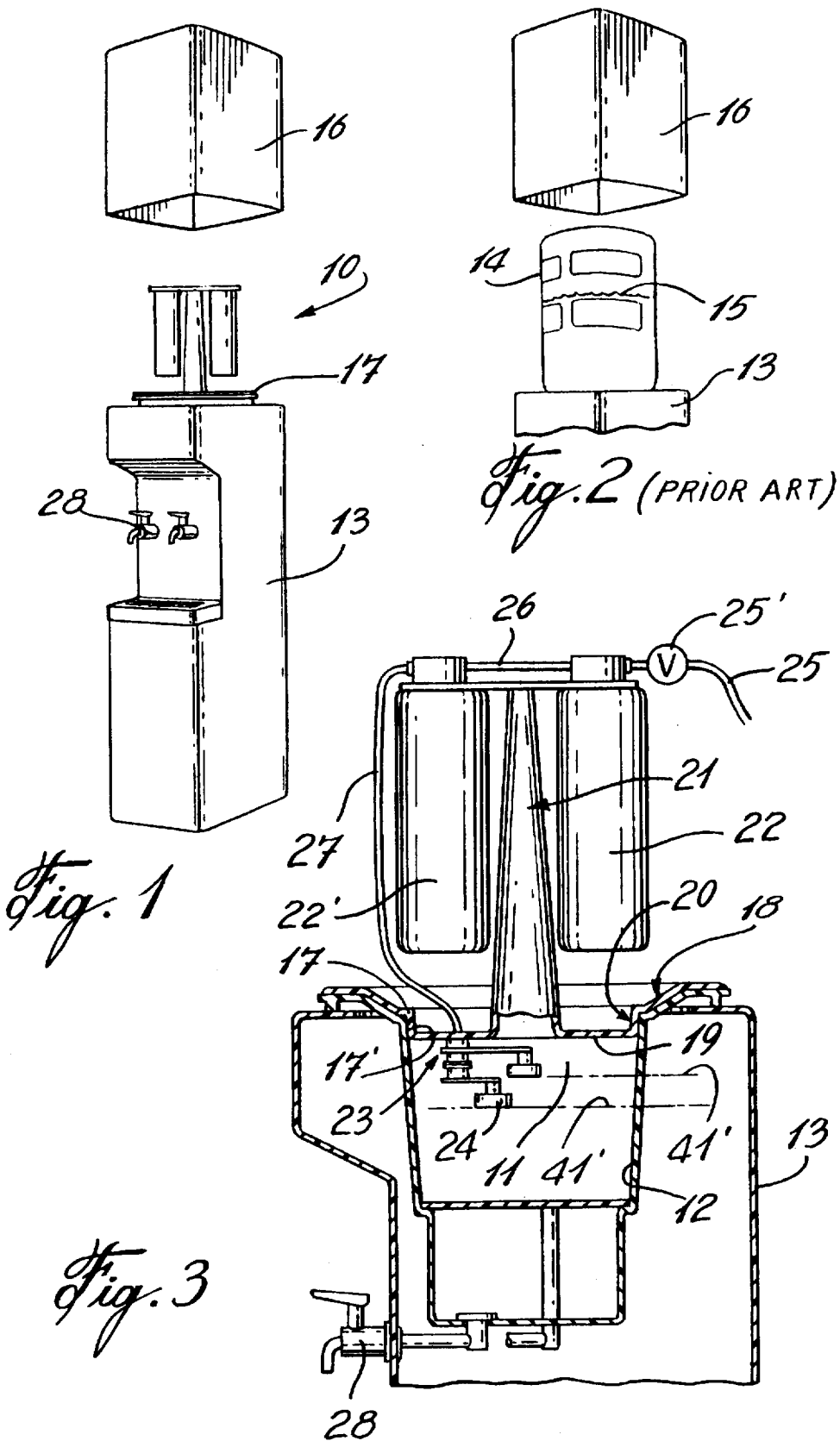

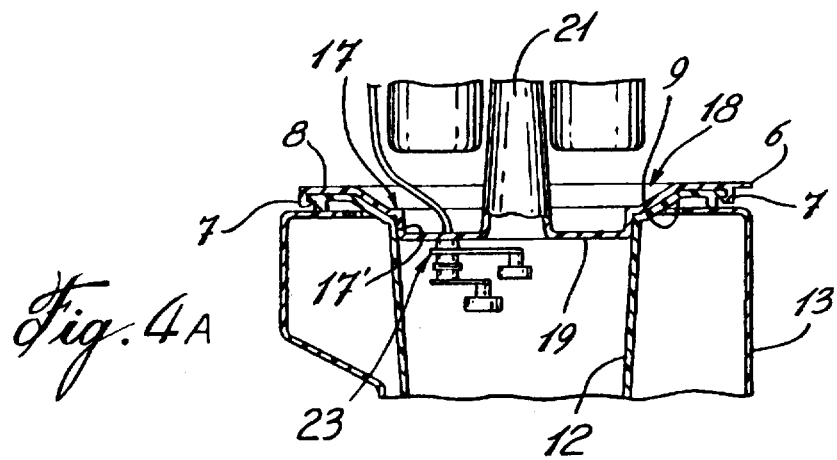
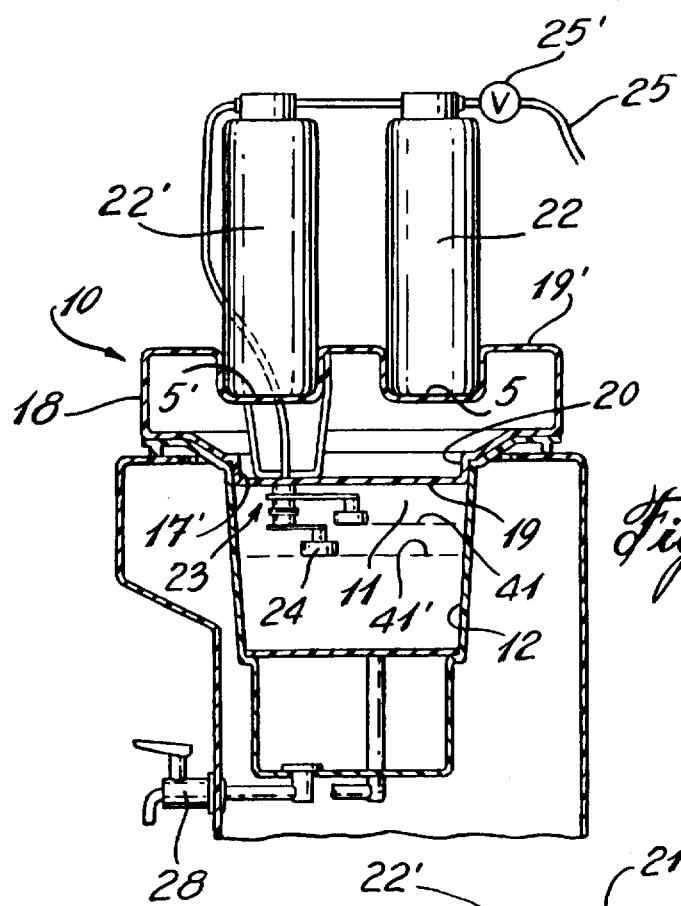
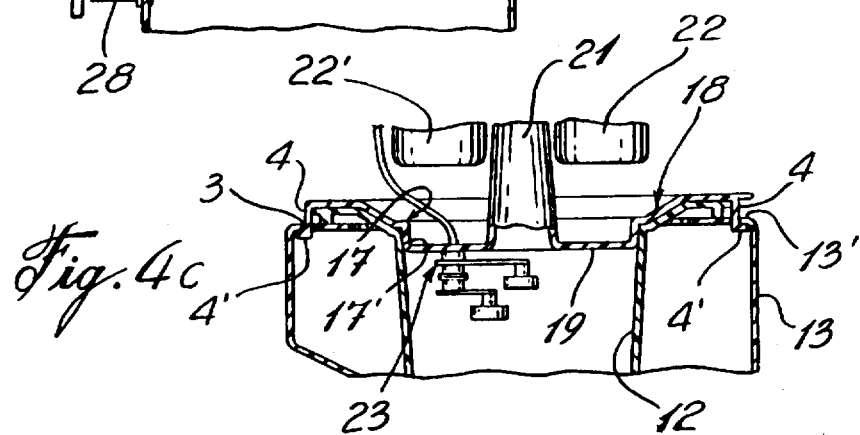

5,730,863

REPLACEABLE WATER FILTER ASSEMBLY FOR WATER-BOTTLE FED COOLER HOUSING

TECHNICAL FIELD

The present invention relates to an adaptor assembly and particularly to a filter cartridge attachment means for use with a bottle fed water cooler whereby to replace the water bottle and feed the reservoir of the water cooler with filtered water.

BACKGROUND ART

There is a growing demand for quality water at the workplace or at home. A popular type of water dispenser consists of a support housing having an open-ended reservoir at a top end thereof with a self-contained refrigerant system whereby to cool the water in the reservoir. A large water bottle is supported in an inverted position on top of this reservoir to feed water thereto by gravity or by other controllable means. A disadvantage of these popular type water dispensers is that bottled water poses many inconveniences such as the handling of heavy containers from the place of purchase to its mounting on top of the reservoir, and the ongoing expenses of purchasing these water bottles or the scheduling of water delivery. Often you need to store large quantities of these heavy 5 gallon bottles if they are used in the workplace. These water coolers may also need to be disinfected once in a while depending on the quality of the water being dispensed through the valve system.

In an attempt to resolve the problem of dispensing quality water through such water coolers, attempts have been made to incorporate filters within these water coolers to treat the water which is dispensed from these bottles. Most of the water that is dispensed from these bottles is spring water which may or may not have been filtered as well as tap water which may be filtered before insertion into the water bottles. Reference is herein made to U.S. Pat. No. 4,995,975 which shows a unitary water cooler equipped with a filter device to filter the water from an inverted water bottle. The filter device is located within the reservoir. Accordingly, this patent serves as an indication of the need to have bottled water filtered prior to being consumed by a user person. However, with this water cooler there is still a need to handle heavy 5 gallon water bottles and the expense associated therewith.

There are water coolers with filter cartridges incorporated in the housing during the construction thereof. The housing must therefore be adapted to service these filters and needs to be permanently wired. With the filter cartridges mounted internally, they are difficult to service.

SUMMARY OF INVENTION

It is a feature of the present invention to provide an adaptor assembly to replace the bottles of water coolers of the type which is usually fed by gravity and wherein the bottle is supported in an inverted position over the water reservoir of the housing, whereby to support water purification means to feed the reservoir with treated water.

Another feature of the present invention is to provide an adaptor assembly which is adaptable to existing water coolers of the type having inverted water bottles mounted at a top end thereof and concealed by a cover and further wherein the adaptor assembly detachably secures itself over the top open end reservoir of these water coolers.

Another feature of the present invention is to provide an adaptor assembly capable of support filter cartridges to feed tap water to the reservoir of bottle fed water coolers and wherein the filters remove up to 99% of potential harmful volatile organic chemicals, including chlorine, chloramines, asbestos, molds, algae, dirt, off-tastes and odors from a tap water supply.

Another feature of the present invention is to provide an adaptor assembly for a water cooler of the type which is fed by an inverted water bottle and wherein the water bottle is replaced by the adaptor and supports the filter cartridges whereby to ensure an unlimited supply of fresh, clean drinking water at a substantial savings when compared to bottled water and which eliminates the need of handling the heavy 5 gallon water bottles.

Another feature of the present invention is to provide a filter cartridge adaptor which is removably securable over the top open end reservoir of a bottle fed water cooler whereby to replace the bottle with a filtered tap water supply.

According to the above features, from a broad aspect, the present invention provides an adaptor assembly for adapting a water purification means to a water cooler of the type having a support housing provided with a water bottle support means at a top end to support an inverted water bottle over a water reservoir. The adaptor assembly comprises a support platform having an attachment base for support engagement over the water reservoir. The support platform has water purification retention means for supporting one or more water purification means thereabove. A dispensing valve is secured to the support platform and projects under the attachment base and has conduit means to receive treated water from the water purification means. The valve has water level sensing means adapted to detect a water level in the reservoir to dispense or cut-off a supply of the treated water to the reservoir. The filter means has a water inlet for connection to a pressurized water supply.

BRIEF DESCRIPTION OF DRAWINGS

A preferred embodiment of the present invention will now be described with reference to the examples thereof as illustrated by the accompanying drawings in which:

FIG. 1 is an exploded perspective view showing the adaptor assembly of the present invention supporting filter cartridges above a water reservoir of a bottle fed water cooler with the cover of the housing shown removed;

FIG. 2 is a perspective view showing the water cooler of the prior art with an inverted water bottle positioned over the water reservoir;

FIG. 3 is a simplified fragmented side view showing the position of the adaptor assembly secured over the water reservoir of the water cooler housing;

FIGS. 4A to 4C are simplified fragmented section views showing how the attachment base of the filter support platform can be secured above the reservoir of the water cooler;

DESCRIPTION OF PREFERRED EMBODIMENTS

Figure 5:
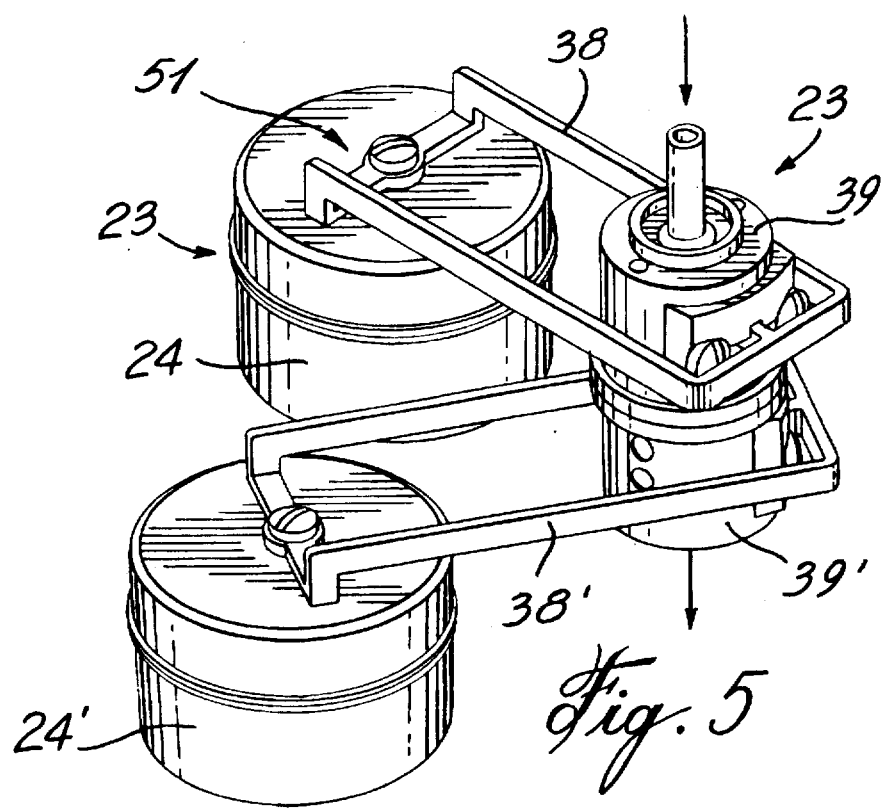
FIG. 5 is a perspective view showing the construction of the dispensing valve and level sensing floats.

Referring now to the drawings, and more particularly to FIGS. 1 to 3, there is shown generally at 10 the adaptor assembly of the present invention for mounting filter cartridges 22, 22' over the top open end 11 of a water reservoir 12 of a water cooler housing 13. As shown in FIG. 2, the housing 13 is of the type adapted to support a large inverted water bottle 14 over the reservoir whereby to dispense water 15 contained therein within the reservoir 12. This water bottle is usually concealed by a cover 16 which fits over the water bottle and sits on top of the housing. The present invention replaces this water bottle by the adaptor assembly 10, as shown in FIG. 1, and this adaptor assembly and the cartridges connected thereto are concealed by the cover 16 which is positionable thereover and which provides access to the filter cartridges for maintenance purposes wherein to interchange filters and permitting access to the assembly. The filter cartridges 22 and 22' are also referred to herein as water purification means as other type of water treating devices can be connected to the adaptor 10. For example, ultraviolet water treating devices can be supported by the adaptor.

As shown in FIG. 3, the water reservoir 12 may have various shapes and is usually formed with a support rim 17 whereby to receive a shoulder portion of the bottle 14 in support engagement thereon, as is well known in the art. With the present invention the adaptor assembly 10 is provided with a support platform 18 which has a support base 19 and a circumferential flange or side wall 20 for frictional fit engagement about the side wall 17 of the reservoir 12 and adjacent the support rim 17. A filter cartridge attachment support tree 21 extends from the support base 19 and is adapted to support one or more filter cartridges 22, 22' above the support platform.

A dispensing valve assembly 23 is secured under the support base 19 and extends within the water reservoir and is provided with a float assembly 24 to sense the level of water within the reservoir 12 to dispense or cut-off the supply of treated water from the filters to the reservoir. The filter cartridges 22 and 22' are hereinshown connected in series and a water inlet 25 of filter 22 is connected to a suitable pressurized tap water line (not shown) so that water will enter the inlet 25, through a shut-off valve 25', pass through the first filter 22, and then through the second filter 22' by its interconnection 26 and then via the outlet feed pipe 27 to the dispensing valve assembly 23. The filters 22 and 22' may have different functions and three or four of these filters may be supported by the support tree 21 depending on the water treatment that is desirable prior to feeding the water into the reservoir 12 which is then dispensed through the dispensing valves 28. Essentially, the purpose of these filter cartridges 22 and 22' is to reduce trihalomethanes and suspected carcinogens below regulated limits and to further take out chlorine, chloramines and extreme tastes and odors from the water supply connected thereto.

The support platform 18 as shown in FIG. 3 is adapted for friction fit about the side wall 17 of the water cooler reservoir whereby to provide a stable and rigid connection of the filter attachment support tree 21 thereto and particularly to resist any imbalance due to unequal weights depending on the number of filters being supported by the tree.

FIG. 4A illustrates a further embodiment of the support platform 18. As hereinshown the reservoir 12 has a top wall 9 with an outer peripheral flange 8 which projects therefrom. This outer peripheral flange may be entirely about the circumference of the top wall or sections thereof. The adaptor support platform 18 is provided with an undercut lip 7 whereby to removably connect the adaptor over the reservoir. A flange wall 6 is used to pry the undercut lip from its connection to detach the support platform 18. If the outer peripheral flanges 8 are flange sections, then the support platform is connected by simply rotating it until the undercut lip engages with the peripheral flange sections 8.

FIG. 4B shows a still further embodiment wherein the support platform 18 is formed from blow molding and wherein the support base 19 is frictionally retained at its support base 19 with the side wall 17' of the reservoir 12. As hereinshown the top wall 19' is provided with cavities 5 and 5' whereby to receive in friction fit therein the base portion of the filter cartridges 22 and 22' respectively. This adaptor assembly 10 provides ease of connection and disconnection of the filter cartridges therefrom.

FIG. 4C shows a still further embodiment wherein the support platform 18 is molded with depending clips 4 which are located in openings 3 formed in the top wall 13' of the housing 13. These slots 3 would be provided with larger open ends whereby to permit the clip heads 4' to be inserted under the top wall 13'. Again, the support base would then be rotated in engagement over the open end of the reservoir 12.

Figure 8:
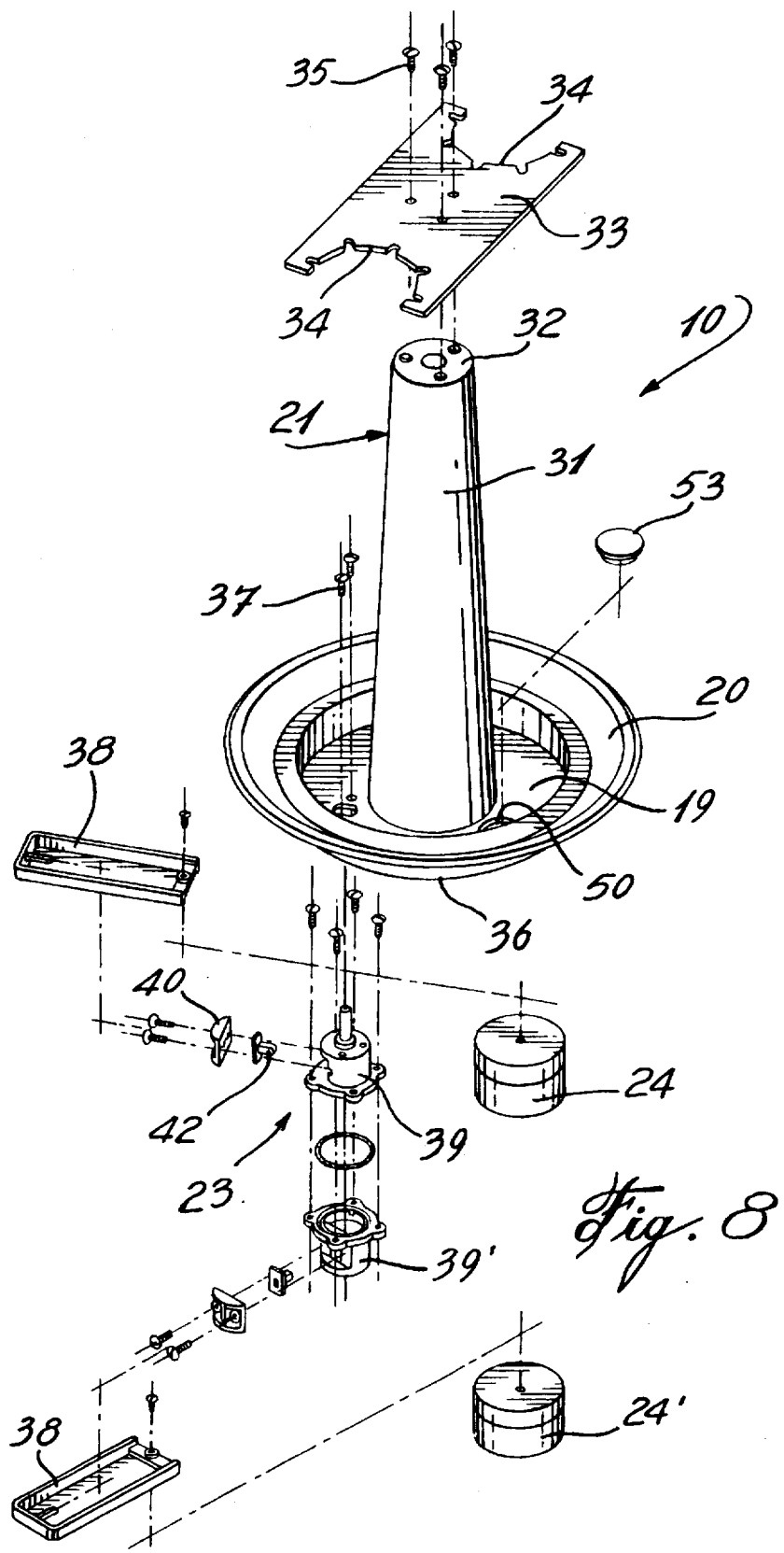
FIG. 8 is an exploded view showing the construction of the adaptor and filter cartridge support post.

Referring now to FIG. 8, there is shown an exploded view of the adaptor assembly embodiment of FIG. 3. As hereinshown, the filter attachment support tree 21 consists of a support post 31 which may be integrally formed with the support base 19 and extend vertically thereabove. The top end 32 of the support post is provided with a detachable plate 33 having a pair of opposed clamping cavities 34 to hold the filter cartridges 22 and 22'. This detachable plate 33 may be provided with at least four clamping cavities if it is desirable to support four cartridges connected in series for special filtering purposes. Screw fasteners 35 removably connect the detachable plate to the post 31.

As also shown in FIG. 8, the dispensing valve assembly 23 is secured to an underface 36 of the support base 19 by means of fasteners 37. Therefore, the valve assembly is easily detachable for replacement or repair. The dispensing valve assembly is provided with a float 24 which is secured to a pivotal arm 38 which is attached to the valve housing 39 by a pivoting mechanism 40. As the pivotal arm pivots when the water level within the reservoir is displaced below the predetermined level 41, as shown in FIG. 7, a closure member 42 moves in and out of a valve seat 43, as shown in FIG. 6, to permit water to be dispensed through the valve body 39 or to obstruct the valve port or conduit 44 to cut the water supply.

Figure 6:
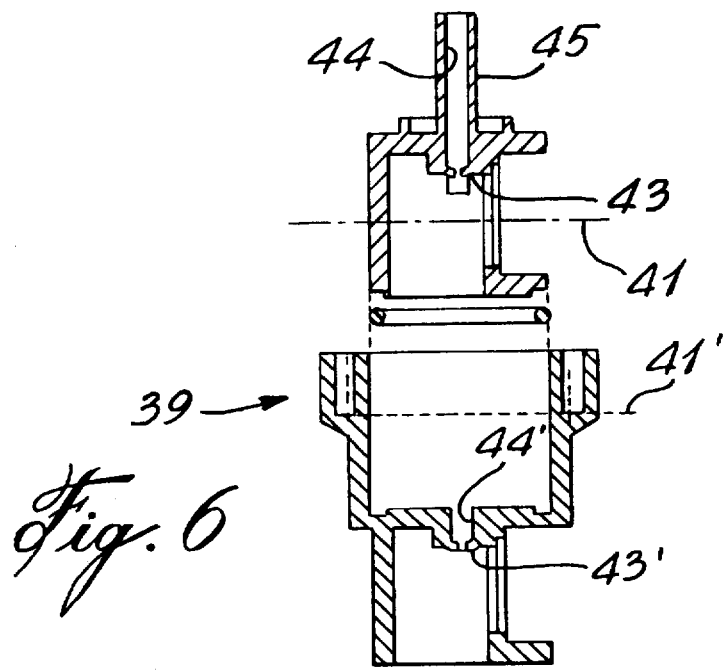
FIG. 6 is a simplified exploded fragmented section view of the construction of the dispensing valve body.
Figure 7:
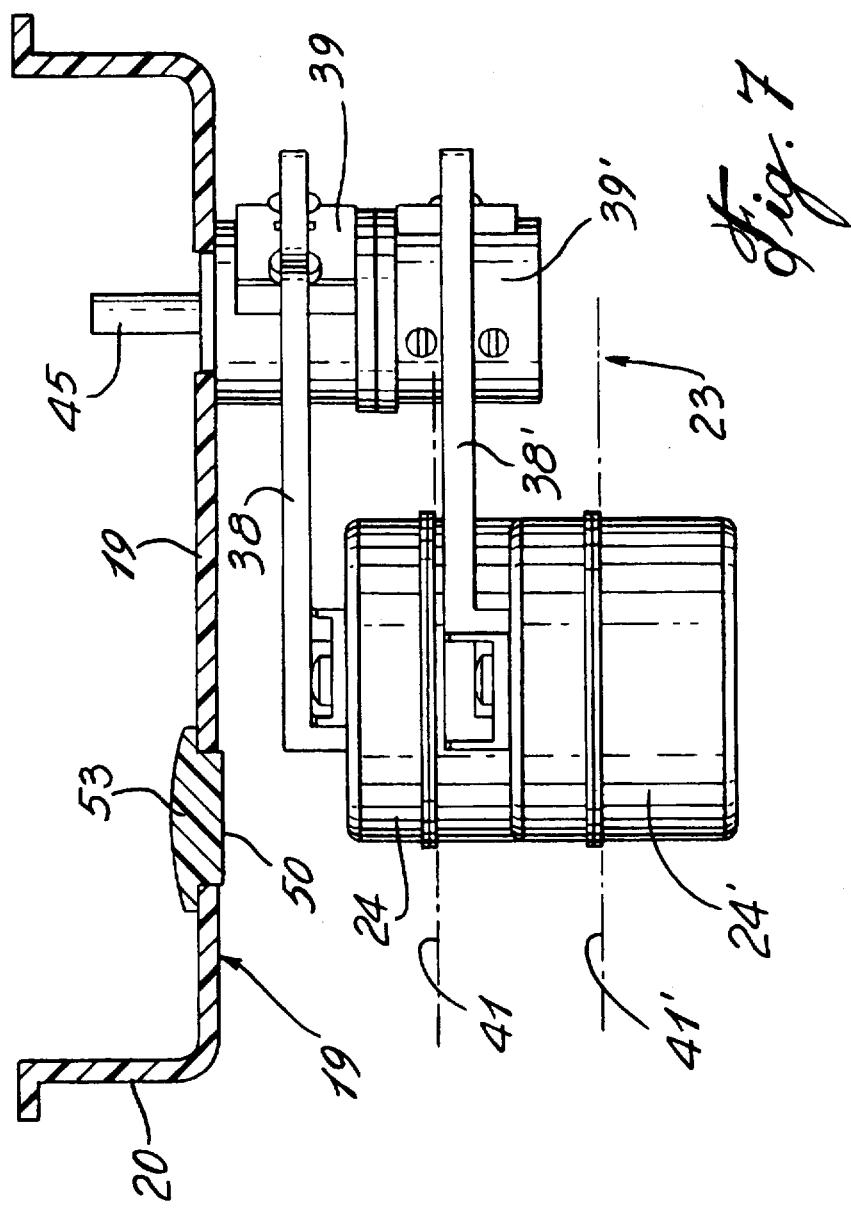
FIG. 7 is a side view of the dispensing valve assembly and showing its relationship with the support base of the adaptor support platform.

With additional reference now to FIGS. 5 to 7, it can be seen that the dispensing valve assembly 23 is provided with two float valve bodies 39 and 39' each having a water level detecting float assembly consisting of floats 24 and 24' connected to a respective pivotal arm 38 and 38'. The valve bodies 39 and 39' are interconnected and an O-ring seal 40' seals their housings. As can be seen from FIG. 5, these floats are offset from one another and each adapted to cut off the water supply from the inlet nipple connection 45 when a first predetermined water level 41' or a second predetermined water level 41 is detected within the reservoir. The lowermost float 24' detects a normal predetermined water level desired, 41', within the reservoir 12 and the uppermost float 24 usually maintains the valve port 44 open.

As can be seen from FIGS. 6 and 7, the valve assembly 23 has a second valve seat 43' associated with the lower float 24' and the upper valve port 44 remains open with the water being dispensed through the valve port 44'. Should the lower float 24' assembly malfunction, and in order to prevent pressurized water to be continuously supplied to the reservoir causing damage, the second valve port 44 will close once the water within the reservoir reaches the second predetermined water level 41. Should this condition occur it is unlikely to be detected by the user unless an alarm or other form of visual indication is given to indicate to the user this valve malfunction. To achieve this objective there is provided an aperture 50 formed within the support base 19 and aligned with at least a portion of the top wall 51 of the float 24. A protective plastic or glass cover 53 may cover the hole 50 for sanitary purposes. This aperture provides the user with a visible means to detect the position of the float 24. Additionally, the top wall 51 of the float is of a color which is easy to detect and accordingly when the float 24 is in its position, as shown in FIG. 7, the color will be easily seen through the aperture providing an indication of a lower valve malfunction. A covering or plug 53 may also be constructed of magnified glass to amplify this condition.

Although the dispensing valve assembly 23 is provided with a two-section valve body, as shown in FIG. 6, the invention also contemplates the use of a single float valve.

The adaptor assembly of the present invention was conceived whereby to adapt water purification means, such as the filter cartridges, to existing water cooler housings wherein to replace the water bottle with the filter assembly. This provides easy conversion of bottle-fed water coolers whereby to adapt them to a filtered tap water supply. Alternatively, water coolers may be manufactured with this removable filter assembly to provide ease of maintenance and ease of reconverting the water cooler from the filter assembly, back to the water bottle dispensing, if the user wishes to do so. Accordingly, the water cooler of the present invention may have a dual function, this being to dispense bottled water or filtered tap water.

It is within the ambit of the present invention to cover any other obvious modifications of the preferred embodiment described herein, provided such modifications fall within the scope of the appended claims.

We claim:

1. A filter adaptor assembly for adapting a water purification means to a water cooler of the type having a support housing provided with a water bottle support means at a top end to support an inverted water bottle over a water reservoir, said adaptor assembly comprising a support platform provided with a circular disc-like attachment base having a circumferential side wall for support engagement of said platform in a top open end section of said water reservoir, and one or more undercut connecting flanges disposed under a peripheral end section of said attachment base for retention engagement thereof with a respective flange connection formed in a peripheral edge of said top end section of said water reservoir, said support platform having water purification retention means for detachably supporting one or more filter cartridges above said attachment base, and a dispensing valve secured to said support platform and projecting under said attachment base and having conduit means to receive treated water from said one or more filter cartridges, said valve having water level sensing means adapted to detect a water level in said reservoir to dispense or cut-off a supply of said treated water to said reservoir, said one or more filter cartridges having a water inlet for connection to a pressurized water supply.

2. A filter adaptor assembly as claimed in claim 1 wherein said filter cartridges are detachably connected to said attachment base.

3. A filter adaptor assembly as claimed in claim 2 wherein said attachment base is shaped for frictional engagement about said top open end section of said water reservoir.

4. A filter adaptor assembly as claimed in claim 2 wherein said attachment base is provided with two or more clip connectors depending from an outer peripheral edge thereof for locking engagement with a respective locking slot provided in a top wall of said housing spaced from an outer peripheral edge thereof.

5. A filter adaptor assembly as claimed in claim 2 wherein said attachment base is comprised of a support post extending vertically from said support base and having a connecting bracket in a top end thereof for removable connection of said filter cartridges.

6. A filter adaptor assembly as claimed in claim 2 wherein said dispensing valve is secured to an underface of said support base to position same above said water reservoir.

7. A filter adaptor assembly as claimed in claim 6 wherein said water cooler is provided with a removable top cover dimensioned and shaped to enclose a water bottle, said adaptor assembly replacing said water bottle and being concealed by said removable top cover.

8. A filter adaptor assembly as claimed in claim 6 wherein said water level sensing means is a float valve having a pivotal arm provided with a float at a free end to sense a water level in said reservoir, and a valve seat plug actuable by pivotal displacement of said pivotal arm to close and open a valve port in said conduit means to control said supply of said treated water to said reservoir.

9. A filter adaptor assembly as claimed in claim 8 wherein there are two of said float valves, a first of said float valves detecting a first predetermined water level and a second of said float valves detecting a second water level above said first predetermined water level.

10. A filter adaptor assembly as claimed in claim 9 wherein an aperture is provided in a bottom wall of said attachment base and aligned with said float of said second of said float valves to detect the position thereof.

11. A filter adaptor assembly as claimed in claim 10 wherein said float of said second of said float valves is provided with a colored top wall which is visible through said aperture to serve as an indicator that said first of said float valve is defective.

12. A filter adaptor assembly as claimed in claim 1 wherein said support platform has a molded base having a top wall spaced from said attachment base, and one or more cavities in said top wall, each shaped to frictionally engage a bottom end portion of one of said filter cartridges.

13. A filter adaptor assembly as claimed in claim 12 wherein said support platform is a blow-molded circular support platform.

\* \* \* \* \*